United States Patent [19]

König et al.

[11] Patent Number: 4,636,545
[45] Date of Patent: Jan. 13, 1987

[54] AQUEOUS DISPERSIONS OF GRAFT POLYMERS OR COPOLYMERS, A PROCESS FOR THEIR PRODUCTION AND THEIR USE AS HYDROPHOBIZING AND OLEOPHOBIZING AGENTS FOR TEXTILES

[75] Inventors: Joachim König; Carlhans Süling, both of Odenthal; Klaus Nachtkamp, Cologne, all of Fed. Rep. of Germany

[73] Assignee: Bayer Aktiengesellschaft, Leverkusen, Fed. Rep. of Germany

[21] Appl. No.: 703,011

[22] Filed: Feb. 19, 1985

[30] Foreign Application Priority Data

Feb. 29, 1984 [DE] Fed. Rep. of Germany ....... 3407362

[51] Int. Cl.[4] .................... C08F 2/20; C08F 283/00; C08L 51/08
[52] U.S. Cl. .................................. 524/457; 525/455
[58] Field of Search ........................................ 524/457

[56] References Cited

U.S. PATENT DOCUMENTS

| | | | |
|---|---|---|---|
| 3,068,187 | 12/1962 | Bolstad et al. | 260/29.6 |
| 3,403,122 | 9/1968 | Sherman et al. | 260/29.6 |
| 3,684,758 | 8/1972 | Honig et al. | 260/29.6 |
| 3,684,759 | 8/1972 | Reiff et al. | 260/29.6 |
| 3,705,164 | 12/1972 | Honig et al. | 260/29.6 |
| 4,269,748 | 5/1981 | Nachtkamp et al. | 260/29.2 TN |
| 4,373,043 | 2/1983 | Yagi | 524/457 |
| 4,373,053 | 2/1983 | Sato | 524/457 |

Primary Examiner—C. Warren Ivy
Attorney, Agent, or Firm—Gene Harsh; Joseph C. Gil; Thomas W. Roy

[57] ABSTRACT

The present invention relates to aqueous dispersions of graft polymers or graft copolymers containing as the graft base an aqueous polyurethane dispersion optionally containing block polyisocyanates in dispersed form as crosslinker and, as the graft covering, a polymer or a copolymer of ethylenically unsaturated monomers, characterized in that the graft covering is a polymer of ethylenically unsaturated perfluoroalkyl monomers having a molecular weight above 367 or a copolymer of perfluoroalkyl monomers such as these with comonomers free from perfluoroalkyl groups.

The present invention also relates to a process for producing these dispersions and to their use as hydrophobizing and oleophobizing agents for textiles.

6 Claims, No Drawings

AQUEOUS DISPERSIONS OF GRAFT POLYMERS OR COPOLYMERS, A PROCESS FOR THEIR PRODUCTION AND THEIR USE AS HYDROPHOBIZING AND OLEOPHOBIZING AGENTS FOR TEXTILES

BACKGROUND OF THE INVENTION

1. Field of the Invention

This invention relates to aqueous dispersions of graft polymers or copolymers of ethylenically unsaturated perfluoroalkyl monomers containing aqueous polyurethane dispersions as the graft base, to a process for producing these dispersions by polymerizing or copolymerizing ethylenically unsaturated perfluoroalkyl monomers and, optionally, comonomers free from perfluoroalkyl groups in aqueous polyurethane dispersions as the graft base and to their use as hydrophobizing and oleophobizing agents for textiles.

2. Description of the Prior Art

Polymers containing perfluoroalkyl groups are suitable substances for hydrophobizing and oleophobizing (making oil or grease resistant) textiles or carpets. These polymers may be used in the form of aqueous emulsions. However, the production of aqueous emulsions by known methods of emulsion polymerization is difficult because ethylenically unsaturated perfluoroalkyl monomers are completely insoluble in water and stable emulsions cannot be obtained in water.

U.S. Pat. No. 3,403,122 describes an emulsion polymerization process for producing perfluoroalkyl polymers in aqueous media which contain from 5 to 50% of water-soluble, organic substances, for example acetone or methanol, to increase the solubility of the monomers in water. However, coarse, unstable dispersions are obtained in this way. In addition, water-soluble, organic solvents such as acetone or methanol are precipitants for numerous polymers so that this process cannot be applied to many of the copolymerization systems normally used.

U.S. Pat. No. 3,068,187 describes segmented copolymers, i.e. block or graft copolymers of ethylenically unsaturated perfluoroalkyl monomers with ethylenically unsaturated monomers containing less than 10% of fluorine and also a process for their production by emulsion polymerization in which the monomer containing less than 10% of fluorine, for example butadiene or chloroprene, is prepolymerized in aqueous emulsion, accompanied or followed by polymerization of the perfluoroalkyl monomer onto this pre-emulsion. However, the addition of water-soluble solvents (such as acetone or methanol) is necessary in this process, too, so that the stability of the emulsion obtained is reduced or, alternatively, complete coagulation may even occur.

To obviate these disadvantages, corresponding "perfluoroalkyl polymer emulsions" are generally prepared by solution polymerization in solvents which are insoluble in water (for example, methylisobutyl ketone, halogenated hydrocarbons or acetic acid esters) and are suitable as solvents both for the monomers and also for the polymers. By emulsifying this polymer solution in water using special emulsifying units or homogenizers, it is generally possible to obtain sufficiently fine, stable dispersions. However, this process is made complicated and expensive by the need for the additional step of emulsification, so that there is still a need for a technically simpler emulsion polymerization process.

It has now been found that hydrophobizing and oleophobizing dispersions which are stable in storage can be obtained by subjecting the ethylenically unsaturated perfluoroalkyl monomers described in detail hereinafter, preferably in combination with other vinyl monomers, to graft polymerization in the process of aqueous polyurethane dispersions. Irrespective of the graft yield, the total quantity of polymerized monomers is referred to as the "graft covering."

Although DE-OS No. 19 53 345, DE-OS No. 19 53 348 and DE-OS No. 9 53 349 describe the production of aqueous dispersions of polymers of ethylenically unsaturated monomers in aqueous polyurethane or oligourethane dispersions, the discovery according to the invention (that it is possible to produce storable dispersions of graft polymers or copolymers of ethylenically unsaturated perfluoroalkyl monomers) must be regarded as surprising, even in the light of the disclosure of the above-mentioned prior publications, because stable polymer emulsions can also be produced by other methods from the monomers mentioned in these prior publications, so that it could not have been expected that the above-mentioned difficulties involved in the production of aqueous dispersions of perfluoroalkyl polymers would be overcome by using aqueous polyurethane dispersions as the graft base. The dispersions according to the invention described in more detail hereinafter are further distinguished from the dispersions according to the above-mentioned prior publications by the fact that they are outstanding oleophobizing agents for textiles.

SUMMARY OF THE INVENTION

The present invention relates to aqueous dispersions of graft polymers or graft copolymers containing as the graft base an aqueous polyurethane dispersion optionally containing block polyisocyanates in dispersed form as crosslinker and, as the graft covering, a polymer or a copolymer of ethylenically unsaturated monomers, characterized in that the graft covering is a polymer of ethylenically unsaturated perfluoroalkyl monomers having a molecular weight above 367 or a copolymer of perfluoroalkyl monomers such as these with comonomers free perfluoroalkyl groups.

The present invention also relates to a process for producing these dispersions by the polymerization or copolymerization of ethylenically unsaturated monomers or of mixtures of ethylenically unsaturated monomers in aqueous polyurethane dispersions optionally containing blocked polyisocyanates in dispersed form as crosslinker, characterized in that ethylenically unsaturated perfluoroalkyl monomers having a molecular weight above 367 or mixtures of perfluoroalkyl monomers such as these with ethylenically unsaturated monomers free from perfluoroalkyl groups in a ratio by weight of perfluoroalkyl monomers to monomers free from perfluoroalkyl groups of at least 3:2 are used as the ethylenically unsaturated monomers.

The present invention also relates to the use of these dispersions as hydrophobizing and oleophobizing agents for textiles.

DETAILED DESCRIPTION OF THE INVENTION

Aqueous polyurethane solutions suitable for use as the graft base in the process according to the invention are any aqueous dispersions of polyurethanes or polyurethane polyureas. These dispersions generally have a solids content of about 5 to 60% by weight and preferably about 30 to 50% by weight. Aqueous dispersions of polyurethanes containing chemically incorporated ionic and/or nonionic hydrophilic centers are particularly suitable. Dispersions such as these and their production are described, for example, in U.S. Pat. No. 3,479,310, DE-PS No. 1 495 745, DE-AS No. 14 95 847, U.S. Pat. No. 3,920,598, U.S. Pat. No. 3,905,929, U.S. Pat. No. 4,108,814, U.S. Pat. No. 4,092,286, U.S. Pat. No. 4,190,566, U.S. Pat. No. 4,237,264, U.S. Pat. No. 4,238,378, DE-OS No. 27 25 589, DE-OS No. 27 32 131, DE-OS No. 28 11 148, U.S. Pat. No. 4,269,748, U.S. Pat. No. 4,292,226 or DE-OS No. 31 37 748 which corresponds to U.S. Pat. No. 4,452,834, herein incorporated by reference. Particularly highgrade dispersions according to the invention are obtained when aqueous polyurethane dispersions containing blocked polyisocyanates in dispersed form as crosslinker are used as the graft base. The production of polyurethane dispersions such as these is described in the last of the above-mentioned prior publications (DE-OS No. 31 37 748 and U.S. Pat. No. 4,452,834).

The ethylenically unsaturated perfluoroalkyl monomers essential to the invention are any ethylenically unsaturated compounds containing at least 5 perfluorinated carbon atoms in the form of perfluoroalkyl groups, "perfluoroalkyl groups" being understood to be saturated, perfluorinated aliphatic radicals which may have a linear, branched or cyclic structure. Suitable perfluoroalkyl monomers have a monomer weight above 367, i.e. of at least 368. Suitable perfluoroalkyl monomers such as these are, in particular, acrylates or methacrylates corresponding to the following general formulae

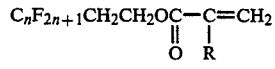

or

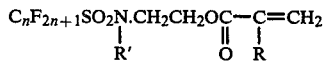

in which
R represents hydrogen or a methyl group,
R' represents hydrogen or an alkyl group containing from 1 to 6 carbon atoms and
n=5 or is an integer of greater than 5, preferably from 5 to 12.

Examples of perfluoroalkyl monomers such as these are N-methyl-N-perfluoropentane sulfonamidoethyl methacrylate, N-methyl perfluorooctane sulfonamidoethyl acrylate, N-methyl-N-perfluorooctane sulfonamidoethyl methacrylate, N-ethyl-N-perfluorooctane sulfonamidoethyl methacrylate, N-propyl-N-perfluorooctane sulfonamidoethyl acrylate, N-hexyl-N-perfluorododecane sulfonamidoethyl acrylate or perfluoropentyl-, perfluorooctyl- or perfluorododecyl-substituted in the 2-position of the ethyl radical of ethyl acrylates or methacrylates. Mixtures of the perfluoroalkyl monomers mentioned by way of example may of course also be used.

In addition to the perfluoroalkyl monomers mentioned by way of example, other comonomers free from perfluoroalkyl groups may also be used. If comonomers such as these are used, the ratio by weight of perfluoroalkyl monomers to comonomers free from perfluoroalkyl groups is at least about 3:2 and preferably at least about 2:1.

Suitable comonomers free from perfluoroalkyl groups include butadiene, isoprene, chloroprene, styrene, α-methyl styrene, p-methyl styrene, vinyl halides (such as vinyl chloride, vinylidene chloride or vinylidene fluoride), vinyl esters (such as vinyl acetate, vinyl propionate, vinyl stearate or vinyl methyl ketone), acrylic acid, methacrylic acid, maleic acid anhydride, acrylic acid esters or methacrylic acid esters (such as methyl acrylate, methyl methacrylate, ethyl acrylate, ethyl methacrylate, propyl acrylate, butyl acrylate, 2-ethylhexyl acrylate or methacrylate, decyl acrylate, lauryl acrylate or methacrylate, stearyl methacrylate, N,N-dimethylaminoethyl methacrylate, 2-hydroxyethyl methacrylate, 2-hydroxypropyl methacrylate or glycidyl methacrylate), acrylamide, methacrylamide, N-methylol acrylamide, acrylonitrile, methacrylonitrile or N-substituted maleic imides. Mixtures of these comonomers are also suitable.

In the practical application of the process according to the invention, the total quantity of ethylenically unsaturated monomers is gauged in such a way that about 25 to 900 parts by weight and preferably about 50 to 500 parts by weight of the ethylenically unsaturated monomers are available per 100 parts by weight of dispersed polyurethane solids.

The graft reaction is normally carried out by initially introducing the polyurethane dispersion as the graft base and subsequently introducing the ethylenically unsaturated perfluoroalkyl monomers and, optionally, the comonomers free from perfluoroalkyl groups in liquid form (for example, in the form of a monomer mixture, solution or aqueous emulsion) and polymerizing or grafting these monomers onto the graft base using radical initiators. The solution or aqueous emulsion is preferably prepared using substantially or completely water-insoluble, preferably polar solvents which are also suitable as solvents for the perfluoroalkyl monomers and the optionally used comonomers free from perfluoroalkyl groups. Examples of these solvents include ketones such as methyl isobutyl ketone; fatty acid esters such as methyl acetate, ethyl acetate, butyl acetate or ethyl propionate; or halogenated hydrocarbons such as methylene chloride, chloroform, carbon tetrachloride, tetrachloroethane, fluorotrichloromethane or 1,1,2-trifluoro-1,2,2-trichloroethane. Mixtures of the solvents mentioned by way of example may of course also be used. It is particularly preferred to use the monomers in the form of aqueous monomer emulsions which may be obtained, for example, by intensively mixing a solution of the monomers in one of the solvents mentioned by way of example with water in the presence of suitable emulsifiers of the type mentioned by way of example in the following. In general, about 10 to 60% by weight solution or emulsions of the monomers are used in the practical application of the process according to the invention. It is of course also possible to use the (liquid) optional comonomer free from perfluoroalkyl groups as solvent for the perfluoroalkyl monomers.

The graft reaction is preferably carried out in the presence of standard radical-forming initiators such as water-soluble initiators which include potassium, sodium or ammonium persulfate or hydrogen peroxide; redox systems of persulfate; and sodium disulfite, sodium hydrogen sulfite or sulfur dioxide. Particularly suitable initiators are oil-soluble initiators such as dibenzoyl peroxide, diacetyl peroxide, dilauroyl peroxide, di-tert.-butyl peroxide, tert.-butyl hydroperoxide, cumene hydroperoxide, tert.butyl peroctoate, azoisobutyrodinitrile, etc.

To improve the graft yields, it is possible to use so-called graft activators, i.e. special substances or monomers having a high transfer activity which are capable of considerably increasing the graft yields even when used in small quantities. Examples of graft activators are olefins (such as propylene or isobutylene), vinyl chloride, vinyl acetate or triallyl cyanurate. It is also possible to use so-called regulators (such as allyl compounds or mercaptans) for regulating the molecular weights.

Standard anionic, cationic or nonionic emulsifiers may be used for stabilizing the dispersions according to the invention and also for preparing the monomer emulsions used in the process according to the invention. Examples of anionic emulsifiers are alkyl sulfonates, alkyl aryl sulfonates, fatty alcohol sulfates or sulfosuccinic acid esters or emulsifiers containing perfluoroalkyl groups (such as ammonium or tetraethylammonium salts of perfluorooctane sulfonic acid or the potassium salt of N-ethyl-N-perfluorooctane sulfonyl glycine). Examples of cationic emulsifiers are quaternary ammonium of pyridinium salts such as stearyl dimethyl benzylammonium chloride or N,N,N-trimethyl-N-perfluorooctane sulfonamidopropylammonium chloride. Examples of nonionic emulsifiers are polyglycol esters (such as ethylene oxide/propylene oxide block polymers or copolymers), alkoxylation products, particularly ethoxylation products of fatty alcohols, alkyl phenols, fatty acids, fatty acid amides, sorbitan monooleate or N-alkyl-N-perfluorooctane sulfonyl glycine. Combinations of nonionic emulsifiers with anion-active or cation-active emulsifiers of the type mentioned by way of example are particularly suitable.

The process according to the invention is generally carried out at a temperature of about 20° to 120° C. and preferably at a temperature of about 50° to 100° C., optionally in an inert gas atmosphere (nitrogen) and optionally under pressure. The monomers and also the auxiliaries and additives are generally incorporated in the polyurethane dispersion with continuous stirring. By virtue of the outstanding stability of the dispersions according to the invention, it is readily possible to remove solvents or volatile residual monomers by degassing in standard distillation apparatus (such as for example rotary evaporators or thin-layer evaporators) without the coagulation which normally affects known emulsions of perfluoroalkyl polymers. Odorless, storable dispersions are obtained after degassing. The solids content of the dispersions according to the invention generally amounts to between about 5 and 50% by weight and preferably between about 10 and 30% by weight, depending upon the concentration of the polyurethane dispersion initially introduced and the quantity of water (and any solvent not removed) introduced with the monomers. The fluorine content in the solid generally amounts to between about 6 and 50% by weight and preferably between about 10 and 30% by weight.

Films characterized by outstanding hydrophobicity and oleophobicity may be obtained from the dispersions according to the invention. The dispersions are eminently suitable for use as impregnating agents for oleophobizing and hydrophobizing textiles of natural and synthetic fibers, carpets, papers and leather.

Polyurethane dispersions A and B set forth hereinafter demonstrate two embodiments of the present invention. Polyurethane dispersion A is a non-thermosetting dispersion, while polyurethane dispersion B by virtue of containing a blocked polyisocyanate, is a thermosetting dispersion.

Dispersions according to the invention containing blocked polyisocyanates in dispersed form may be processed by brief heating of the coatings prepared from them to temperatures above 100° C. to form high-grade, crosslinked coatings.

The invention is further illustrated, but is not intended to be limited by the following examples in which all parts and percentages are by weight unless otherwise specified.

EXAMPLES

The following polyurethane dispersions were used in the Examples:

Polyurethane Dispersion A

Constituents:
900 g of a 2000 MW polyester diol based on adipic acid, hexane diol and neopentyl glycol (molar ratio of glycols 65:35)
200 g of N-methylpyrrolidone
13.4 g of trimethylol propane
53.6 g of dimethylolpropionic acid
40.4 g of triethylamine
393 g of 4,4'-diisocyanatodicyclohexylmethane
39.2 g of acetone azine
1788 g of demineralized water.

A homogeneous, clear mixture was prepared at 60° C. from the polyester dehydrated in vacuo at 100° C., the N-methyl pyrrolidone, the trimethylol propane, the dimethylol propionic acid and the triethylamine. The diisocyanate was then added, followed by stirring for about 2 hours at 80° C. until a (corrected) NCO-content of 2.6% was reached.

After cooling to 60° C., the acetone azine was added to the prepolymer obtained. The water was then added with thorough stirring. The resultant finely divided dispersion was stirred for 5 hours at 70° C. It had a solids content of 40% and a Ford cup viscosity (4 mm orifice) of 30 seconds.

Polyurethane Dispersion B

Constituents:
1200 g of 2000 MW polyester diol based on adipic acid, hexane diol and neopentyl glycol (molar ratio of glycols 65:35)
100 g of N-methyl pyrrolidone
53.6 g of dimethylol propionic acid
40.4 g of triethylamine
393 g of 4,4'-diisocyanatodicyclohexylmethane
146 g of blocked polyisocyanate[1])
39.2 g of acetone azine
2446 g of demineralized water.

A homogeneous, clear mixture was prepared at 60° C. from the polyester dehydrated in vacuo at 100° C., the N-methyl pyrrolidone, the dimethylol propionic acid and the triethylamine. The diisocyanate was then added, followed by stirring for 2 to 3 hours at 80° C. until a (corrected)[2] NCO-content of 2.3% was reached. After cooling to 60° C., the blocked polyisocyanate[1] and the acetone azine were successively added to the prepolymer obtained. The water was then added with thorough stirring, resulting in the formation of a finely divided dispersion which was stirred for 5 hours at 70° C.

[1] The blocked polyisocyanate was prepared as follows: 425 g of butanone oxime diluted with 345 g of ethyl glycol acetate were added with cooling to 1000 g of a 90% solution of an isocyanurate polyisocyanate obtained by the trimerization of hexamethylene diisocyanate (NCO-content 20.5%, solvent: ethyl glycol acetate) and the mixture was left to react at 60° C. until the IR-spectrum no longer showed an NCO-band (2250 cm$^{-1}$). The blocked polyisocyanate obtained was in the form of a 75% solution.
[2] The NCO-content determined by amine-acid titration in the usual way is inaccurate because of the presence of triethylamine in the prepolymer. Accordingly, the stated NCO-contents have been corrected.

The dispersion thus obtained had a solids content of 40% and a Ford cup viscosity (4 mm orifice) of 18 seconds.

EXAMPLE 1

The following solutions were prepared at 70° C.:

Solution 1

92.8 g of N-methyl-N-perfluorooctane sulfonamidoethyl methacrylate
23.2 g of stearyl methacrylate
174 g of methyl isobutyl ketone
6.0 g of ethoxylated sorbitan monooleate containing approximately 80 ethylene oxide units per molecule.

Solution 2

302 g of deionized water
6.0 g of potassium salt of N-ethyl-N-perfluorooctane sulfonyl glycine.

By mixing solutions 1 and 2 using an ultrasonic disperser, a monomer emulsion 3 was prepared for use in the following reaction.

300 g of polyurethane dispersion A were introduced into a stirrer-equipped flask and heated under nitrogen to 75° C. The following components were uniformly added over a period of 2 hours at 75° C.:
600 g of monomer emulsion 3 and as solution 4,
6.0 g of dilauroyl peroxide in 100 g of methyl isobutyl ketone.

After stirring for 1 hour at 75° C., the mixture was diluted with 200 g of deionized water and a stable dispersion was obtained without any precipitation of solids.

For degassing, approximately 400 g of distillate were removed in a rotary evaporator at 60° C./200 mbar. 800 g of a stable, substantially odorless dispersion having the following analytical data were obtained as residue:
Solids content: 30.2%
Fluorine content in solid: 17.8%

EXAMPLE 2

The following solutions were prepared at 70° C.:

Solution 1

69.6 g of N-methyl-N-perfluorooctane sulfonamidoethyl methacrylate
46.4 g of butylacrylate
174 g of methyl isobutyl ketone
6.0 g of ethoxylated sorbitan monooleate containing approximately 80 ethylene oxide units per molecule.

Solution 2

302 g of deionized water
6.0 g of the potassium salt of N-ethyl-N-perfluorooctane sulfonyl glycine.

By mixing solutions 1 and 2 using a high-speed mixer, a monomer emulsion 3 was prepared for use in the following grafting reaction.

300 g of polyurethane dispersion B were introduced into a stirrer-equipped flask and heated under nitrogen to 75° C. 600 g of monomer emulsion 3 and also a solution of 5.0 g of dilauroyl peroxide in 100 g of methyl isobutyl ketone were uniformly added over a period of 2 hours at 75° C. After stirring for 1 hour at 75° C., the mixture was diluted with 400 g of deionized water and a stable dispersion was obtained without any precipitation of solids.

The dispersion was degassed by removing approximately 400 g of distillate in a rotary evaporator at 60° C./200 mbar. 1000 g of a stable, substantially odorless dispersion having the following analytical data were obtained:
Solids content: 24.5%
Fluorine content in the solid: 13.6%

EXAMPLE 3

The following solutions were prepared at 60° C.:

Solution 1

92.8 g of N-methyl-N-perfluorooctane sulfonamidoethyl methacrylate
23.2 g of stearyl methacrylate
174 g of ethylacetate
6.0 g of ethoxylated sorbitan monooleate containing approximately 80 ethylene oxide units per molecule.

Solution 2

600 g of deionized water
6.0 g of the potassium salt of N-ethyl-N-perfluorooctane sulfonyl glycine.

By mixing solutions 1 and 2 using an ultrasonic disperser, a monomer emulsion 3 was prepared for the subsequent grafting reaction.

300 g of polyurethane dispersion A were introduced into a stirrer-equipped flask and heated under nitrogen to 75° C. 900 g of monomer emulsion 3 and a solution of 6.0 g of dilauroyl peroxide in 100 g of ethyl acetate were uniformly added over a period of 2 hours at 75° C.

After stirring for 1 hour at 75° C., 300 g of distillate were removed in a rotary evaporator at 60° C./200 mbar with the addition of 300 g of deionized water. 1200 g of a stable dispersion having the following analytical data were obtained:
Solids content: 20.2%
Fluorine content in the solid: 18.0%

EXAMPLE 4

The following solutions were prepared at 70° C.:

Solution 1

92.8 g of N-methyl-N-perfluorooctane sulfonamidoethyl methacrylate
23.2 g of stearyl methacrylate
1.2 g of triallyl cyanurate
174 g of methyl isobutyl ketone
6.0 g of ethoxylated sorbitan monooleate containing approximately 80 ethylene oxide units per molecule.

Solution 2

302 g of deionized water 6.0 g of the potassium salt of N-ethyl-N-perfluorooctane sulfonyl glycine.

By mixing solutions 1 and 2 using an ultrasonic disperser, a monomer emulsion 3 was prepared for use in the following grafting reaction.

300 g of polyurethane dispersion A were introduced into a stirrer-equipped flask and heated under nitrogen to 75° C. 600 g of monomer emulsion 3 and a solution of 6.0 g of dilauroyl peroxide in 100 g of methylisobutyl ketone were uniformly added over a period of 3 hours at 75° C. After stirring for 30 minutes at 80° C., 300 g of distillate were removed in a rotary evaporator at 60° C./200 mbar with the addition of 300 g of deionized water. 1000 g of a stable dispersion having the following analytical data were obtained:
Solids content: 24.4%
Fluorine content in the solid: 17.3%

EXAMPLE 5

The following solutions were prepared at 70° C.:

Solution 1

97.4 g of N-n-propyl-N-perfluorooctane sulfonamido-ethyl acrylate
18.6 g of ethyl acrylate
0.8 g of triallyl cyanurate
175 g of methyl isobutyl ketone
5.6 g of ethoxylated sorbitan monooleate containing approximately 80 ethylene oxide units per molecule.

Solution 2

305 g of deionized water
5.6 g of the potassium salt of N-ethyl-N-perfluorooctane sulfonyl glycine.

By mixing solutions 1 and 2 using an ultrasonic disperser, a monomer emulsion 3 was prepared for use in the subsequent grafting reaction.

300 g of polyurethane dispersion A were introduced into a stirrer-equipped flask and heated under nitrogen to 75° C. 600 g of monomer emulsion 3 and a solution of 5.0 g of dilauroyl peroxide in 80 g of methyl isobutyl ketone were uniformly added over a period of 3 hours at 75° C.

After stirring for 30 minutes at 80° C., 300 g of distillate were distilled off in a rotary evaporator at 60° C./200 mbar with the addition of 300 g of deionized water. 1000 g of a stable dispersion having the following analytical data are obtained:
Solids content: 23.8%
Fluorine content in the solid: 17.9%

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An oleophobizing and hydrophobizing agent for textiles, natural and synthetic fibers, carpets, papers and leather comprising an aqueous dispersion of graft polymers or graft copolymers prepared by polyermizing or copolymerizing an ethylenically unsaturated monomer or a mixture of ethylenically unsaturated monomers in the presence of an aqueous dispersion consisting essentially of a non-thermosetting polyurethane, wherein the ethylenically unsaturated monomer is an ethylenically unsaturated perfluoroalkyl monomer having a molecular weight above 367 and wherein said mixture of ethylenically unsaturated monomers is a mixture of said perfluoroalkyl monomer with at least one ethylenically unsaturated monomer which is free from perfluoroalkyl groups in a ratio by weight of perfluoroalkyl monomers to monomers free from perfluoroalkyl groups of at least 3:2.

2. The oleophobizing and hydrophobizing agent of claim 1 wherein said agent has a solids content of between about 5 and 50% by weight, and the fluorine content of said solids is between about 6 and 50% by weight.

3. The oleophobizing and hydrophobizing agent of claim 1 wherein said agent has a solids content of between about 10 and 30% by weight and the fluorine content of said solids is between about 10 and 30% by weight.

4. A process for producing an oleophobizing and hydrophobizing agent for textiles, natural and synthetic fibers, carpets, papers and leather comprising an aqueous dispersion of graft polymers or graft copolymers which comprises polymerizing or copolymerizing an ethylenically unsaturated monomer or a mixture of ethylenically unsaturated monomers in the presence of an aqueous dispersion consisting essentially of a non-thermosetting polyurethane, wherein said ethylenically unsaturated monomer is an ethylenically unsaturated perfluoroalkyl monomer having a molecular weight above 367 or wherein said mixture of ethylenically unsaturated monomers is a mixture of said perfluoroalkyl monomers with at least one ethylenically unsaturated monomer which is free from perfluoroalkyl groups in a ratio by weight of perfluoroalkyl monomers to monomers free from perfluoroalkyl groups of at least 3:2.

5. The process of claim 4 wherein said ethylenically unsaturated monomer or said mixture of ethylenically unsaturated monomers are used in the form of a solution in a polar solvent or in the form of an aqueous emulsion.

6. A coated heat-resistant substrate wherein the coating comprises the oleophobizing and hydrophobizing agent of claim 1.

* * * * *